W. P. SMITH.
FERTILIZER DISTRIBUTER.
APPLICATION FILED AUG. 11, 1908.

912,431.

Patented Feb. 16, 1909.
2 SHEETS—SHEET 1.

Witnesses

Inventor
W. P. Smith
By
Attorney

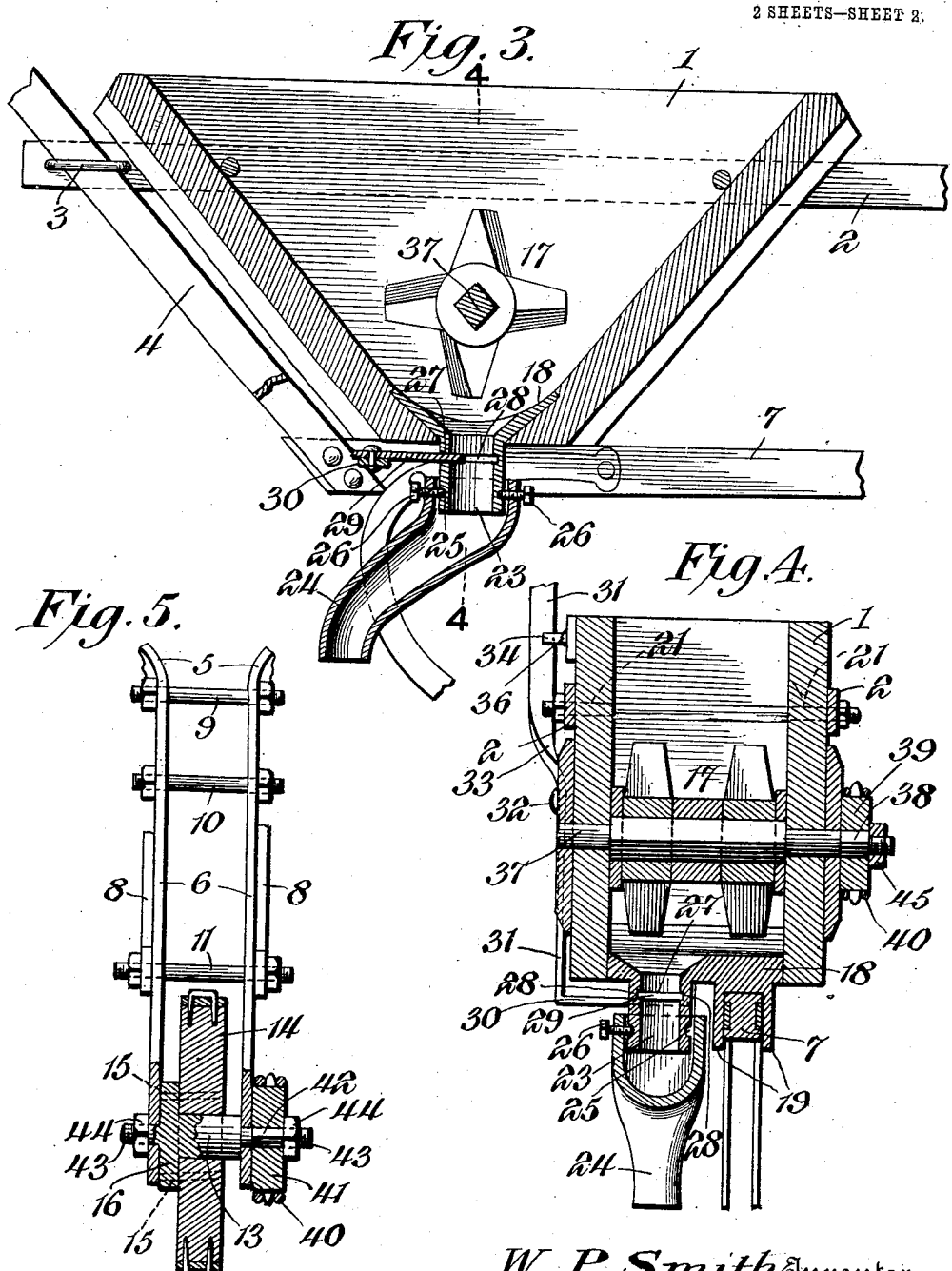

UNITED STATES PATENT OFFICE.

WILLIAM P. SMITH, OF KINARDS, SOUTH CAROLINA.

FERTILIZER-DISTRIBUTER.

No. 912,431.  Specification of Letters Patent.  Patented Feb. 16, 1909.

Application filed August 11, 1908. Serial No. 447,990.

*To all whom it may concern:*

Be it known that I, WILLIAM P. SMITH, a citizen of the United States, residing at Kinards, in the county of Newberry and State of South Carolina, have invented a new and useful Fertilizer - Distributer, of which the following is a specification.

The invention relates to improvements in fertilizer distributers.

The object of the present invention is to improve the construction of fertilizer distributers, and to provide a simple, inexpensive and efficient fertilizer distributer in the form of attachment, adapted to be applied to any ordinary plow without necessitating any alteration in the construction thereof, and capable of adjustment thereon to discharge the fertilizer either in advance or in rear of the foot or shovel of the plow.

A further object of the invention is to provide a fertilizer distributer of this character adapted to also be advantageously employed for planting seed.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

Figure 1:
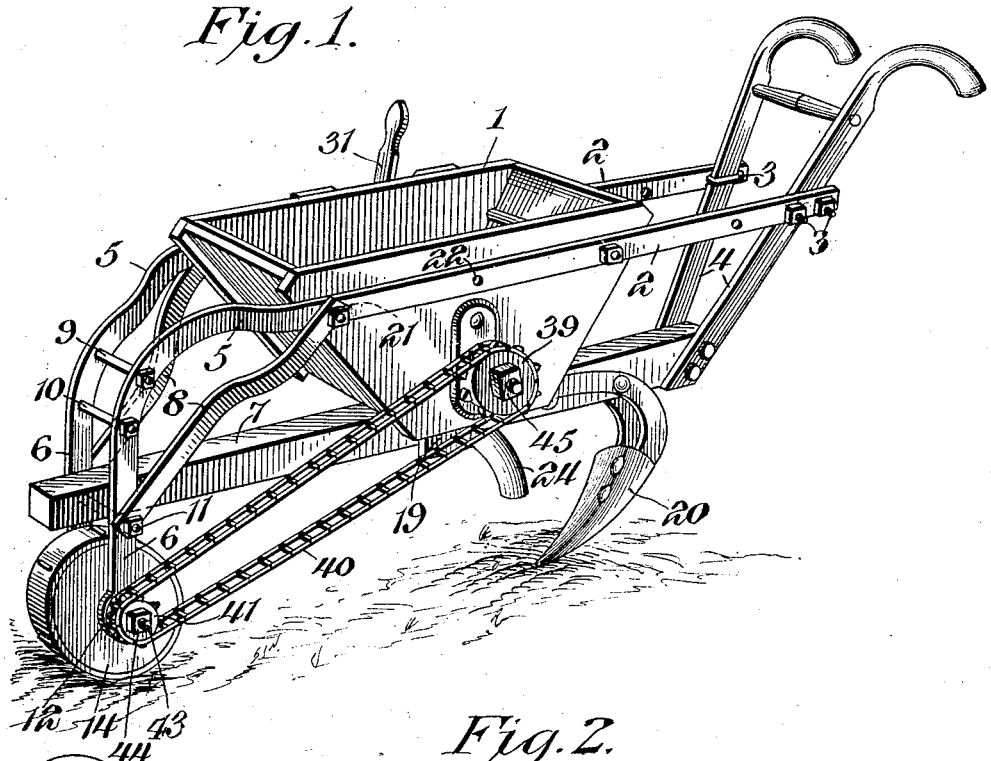
Figure 2:
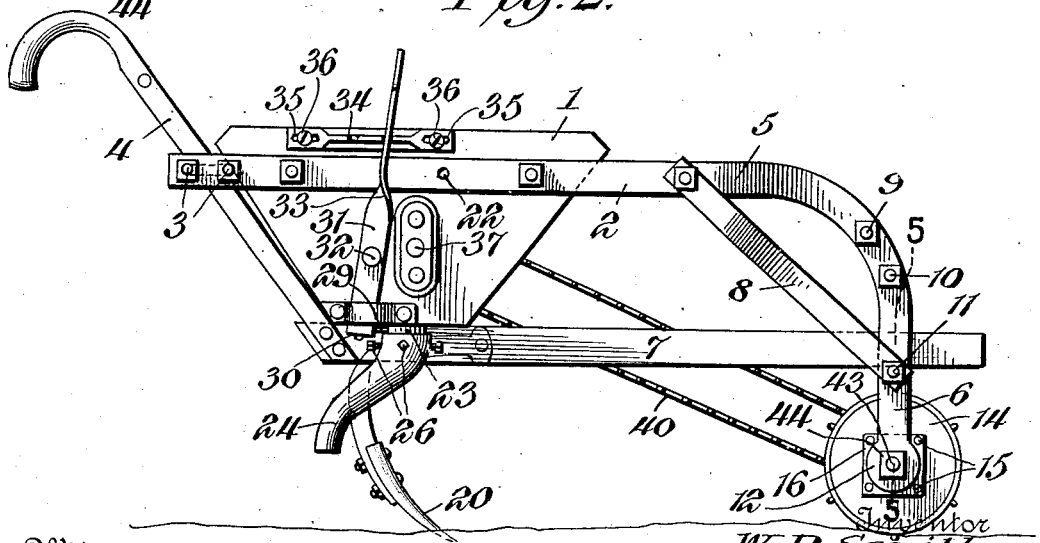

In the drawings:—Figure 1 is a perspective view of a fertilizer distributer, constructed in accordance with this invention and shown applied to a plow. Fig. 2 is a side elevation, showing the opposite side of the fertilizer distributer. Fig. 3 is an enlarged longitudinal sectional view of the hopper. Fig. 4 is a transverse sectional view on the line 4—4 of Fig. 3. Fig. 5 is a vertical sectional view on the line 5—5 of Fig. 2.

Like numerals of reference designate corresponding parts in all the figures of the drawings.

The attachment comprises in its construction a hopper 1 and a frame composed of spaced side bars 2, secured to the outer faces of the sides of the hopper and extending in advance and in rear of the same. The rearwardly extending portions of the side bars are secured to the handle bars 4 of a plow by approximately U-shaped clips, embracing the handle bars and piercing the side bars 2 and equipped with nuts, which engage the outer faces of the said bars 2. The front portions of the side bars are bent inwardly at 5 in advance of the hopper, and are extended downwardly to form approximately vertical portions 6. The vertical portions 6 extend below the stock or beam 7 of the plow, and are braced by inclined bars 8, extending from the vertical front portions 6 at points intermediate of the ends thereof to the horizontal portions of the side bars at the front of the hopper. The spaced front portions 6 of the side bars of the frame are also connected by transverse bolts 9, 10, and 11, arranged at intervals, as shown. The bolts 10 and 11 are spaced apart to provide an opening for the plow stock or beam 7, and the lower ends of the front portions 6 are provided with bearings 12 for the reception of a shaft or axle 13 of a wheel 14. The wheel 14, which is preferably provided at its periphery with lugs to prevent it from slipping, is secured to the shaft or axle by means of bolts 15 piercing the wheel and a vertical attaching flange 16 arranged at and fitted against one side of the said wheel and formed integral with the shaft or axle, as clearly shown in Fig. 5 of the drawings. The wheel, which constitutes a driving wheel for operating an agitator 17, is adapted to support the front portion of the plow, and it causes the same to run easier and enables the plow to be more conveniently handled by the operator.

The hopper, which is downwardly tapered, is preferably provided with a cast iron bottom 18, having depending lugs 19, spaced apart and arranged to straddle the plow beam, as clearly shown in Fig. 4 of the drawings. The hopper is seated on the plow beam and the lugs prevent any lateral movement of the attachment, so that the contents of the hopper will be discharged at the desired point. The outlet of the said hopper is adapted to be arranged to discharge either in advance or in rear of the foot 20 of the plow, and for this purpose the horizontal portions of the side bars are provided with two sets of perforations 21 and 22. The perforations 21 are adapted to receive bolts for securing the hopper in position to discharge in advance of the foot or shovel 20, and the other perforations 22 are adapted to enable the hopper to be arranged in position for discharging in rear of the foot or shovel, as illustrated in Fig. 2 of the drawings.

The bottom of the hopper is provided with an outlet opening, and it has a nipple 23 depending from the outlet opening and located at one side of the plow beam in transverse alinement with the lugs 19, and receiving a discharge spout 24. The nipple is provided with an annular groove 25, adapted to be engaged by screws 26, piercing the upper end of the discharge spout and adapted to secure the same in either of its positions. The discharge spout is slightly S-shaped to offset its lower or discharge end from the plane of its upper attached end, and the fertilizer or grain dropping through the outlet of the hopper is delivered by the discharge spout either in advance or in rear of the plow foot or shovel.

The nipple is provided above the discharge spout with a horizontal slot 27, and it has opposite guide grooves 28 for the reception of a slidable cut-off 29, adapted to be moved inwardly and outwardly to control the discharge of the contents of the hopper. The slidable cut-off is connected to a horizontal arm or portion 30 of a lever 31, fulcrumed at an intermediate point on one side of the hopper at the exterior thereof by means of a bolt 32, or other suitable fastening device and having its upper arm or portion provided with a quarter bend 33 and arranged to engage a ratchet 34. The ratchet 34, which is provided with a plurality of notches, has end slots 35 and is adjustably secured to the hopper by means of screws 36, or other suitable fastening devices. The ratchet is arranged horizontally near the upper edge of one side of the hopper, as clearly shown in Fig. 2 of the drawings.

The agitator 17 is provided with a plurality of blades, set at an angle and adapted to break up and pulverize the fertilizer and work the same towards the outlet opening. The blades are mounted on a transverse shaft 37 journaled in suitable bearings at the sides of the hopper and provided at one end with a squared portion 38 for the reception of a sprocket wheel 39, which is connected by a sprocket chain 40 with a sprocket pinion 41, mounted on a squared portion 42 of the axle. The ends 43 of the axle are threaded for the reception of nuts 44, but any other suitable fastening means may be employed, as will be readily understood. The sprocket wheel 39 is detachably secured on the squared portion 38 of the transverse shaft 37 by means of a nut 45, which engages a threaded portion of the said shaft 37. The sprocket chain, which may be of any ordinary construction, is designed to be lengthened and shortened to accommodate it to the adjustment of the hopper along the side bars to discharge either in advance or in rear of the foot of the plow. When the plow is drawn forward, the wheel rotates and communicates rotary motion to the agitator by means of the sprocket gearing. Any other feeding mechanism, however, may be employed for securing a positive feed of the contents of the hopper.

The attachment while being adjustable to discharge either in advance or in rear of the shovel or foot of the plow does not necessitate any particular construction of the plow and does not interfere with the use of any kind of cultivating device.

Having thus fully described my invention, what I claim as new and desire to secure by Letters Patent, is:—

1. A device of the class described consisting of a plow attachment and including a hopper arranged to be adjustably seated on a plow beam, a frame secured to the hopper and extending in advance and in rear of the same, the rear portion of the frame being arranged to be secured to the plow handles, and the front portion of the frame being arranged to receive the plow beam and extending below the same, a wheel located below the plow beam and mounted in the frame, and feeding means connected with and actuated by the wheel.

2. The combination with a plow, of a hopper provided with spaced lugs depending from the bottom of the same at points between the sides thereof and arranged to straddle a plow beam, and a frame extending along the hopper at a point above the plow beam and projecting in advance of the said hopper and secured to the plow beam and to the handles of the plow.

3. A device of the class described including a hopper arranged to be seated on a plow beam, a frame provided with spaced side bars receiving and secured to the hopper and extending in advance and in rear of the same, the rear portion of the side bars being adapted to be secured to the plow handles, and the front portion of the side bars being extended downwardly and arranged to receive and project below the plow beam, and a wheel mounted between the lower ends of the front portions of the side bars.

4. A device of the class described including a hopper arranged to be seated on a plow beam, a frame provided with spaced side bars receiving and secured to the hopper and extending in advance and in rear of the same, the rear portion of the side bars being adapted to be secured to the plow handles, and the front portion of the side bars being extended downwardly and arranged to receive and project below the plow beam and having transverse connecting fastening devices located above and below the plow beam, and inclined braces extending upwardly and rearwardly from the front portions of the side bars and connected to the latter in rear of the said front portions.

5. A device of the class described including a hopper arranged to be seated on a plow beam and provided at one side thereof with an outlet, said hopper being adjustable longitudinally of the plow beam to discharge either in advance or in rear of the foot or shovel of the plow, a frame composed of spaced side bars receiving the hopper and extending in advance and in rear of the same, the rear portion being arranged to be secured to the plow handles, and the front portion extending downwardly and arranged to receive and extend below the plow beam, a wheel mounted between the front portions of the side bars of the frame, an agitator located within the hopper, and gearing for communicating motion from the wheel to the agitator.

6. The combination with a plow, of a hopper seated on the plow beam and provided at one side thereof with a reversible discharge spout of substantially S-shape and adapted to extend either forwardly or rearwardly to arrange it in advance or in rear of the foot of the plow, and a frame located above the plow beam and extending from the front of the frame to the handles of the plow and having spaced sides receiving the hopper between them and supporting the same on the plow beam.

7. A device of the class described including a hopper arranged to be seated upon a plow beam and provided at one side thereof with a depending nipple having a groove, a reversible discharge spout fitted on the nipple and having screws engaging the groove and detachably securing the spout to the nipple and retaining the former in its adjustment, and a frame connected with the hopper and provided with means for securing the same to a plow.

8. A device of the class described including a hopper provided with a depending nipple, a reversible discharge spout having its lower end off-set from the plane of the upper end, which is fitted on the nipple, and fastening means for securing the discharge spout to the nipple, said fastening means permitting a rotary movement of the spout on the nipple to change the former from one position to another and also fixing the spout to the nipple for retaining the former in its adjustment.

9. A device of the class described consisting of a plow attachment and including a hopper arranged to be seated on a plow beam, a frame secured to the hopper and extending in advance and in rear of the same, the rear portion of the frame being arranged to be secured to the plow handles, and the front portion of the frame being arranged to receive the plow beam and extending below the same, and a wheel located below the plow beam and mounted in the frame.

In testimony, that I claim the foregoing as my own, I have hereto affixed my signature in the presence of two witnesses.

WILLIAM P. SMITH.

Witnesses:
G. R. MILLER,
J. R. LATCHROP.